Patented May 12, 1942

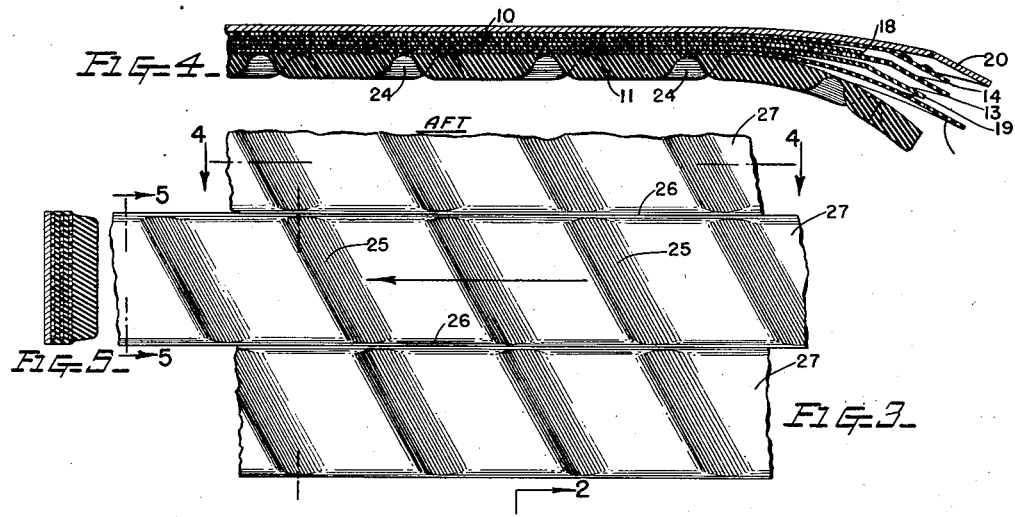
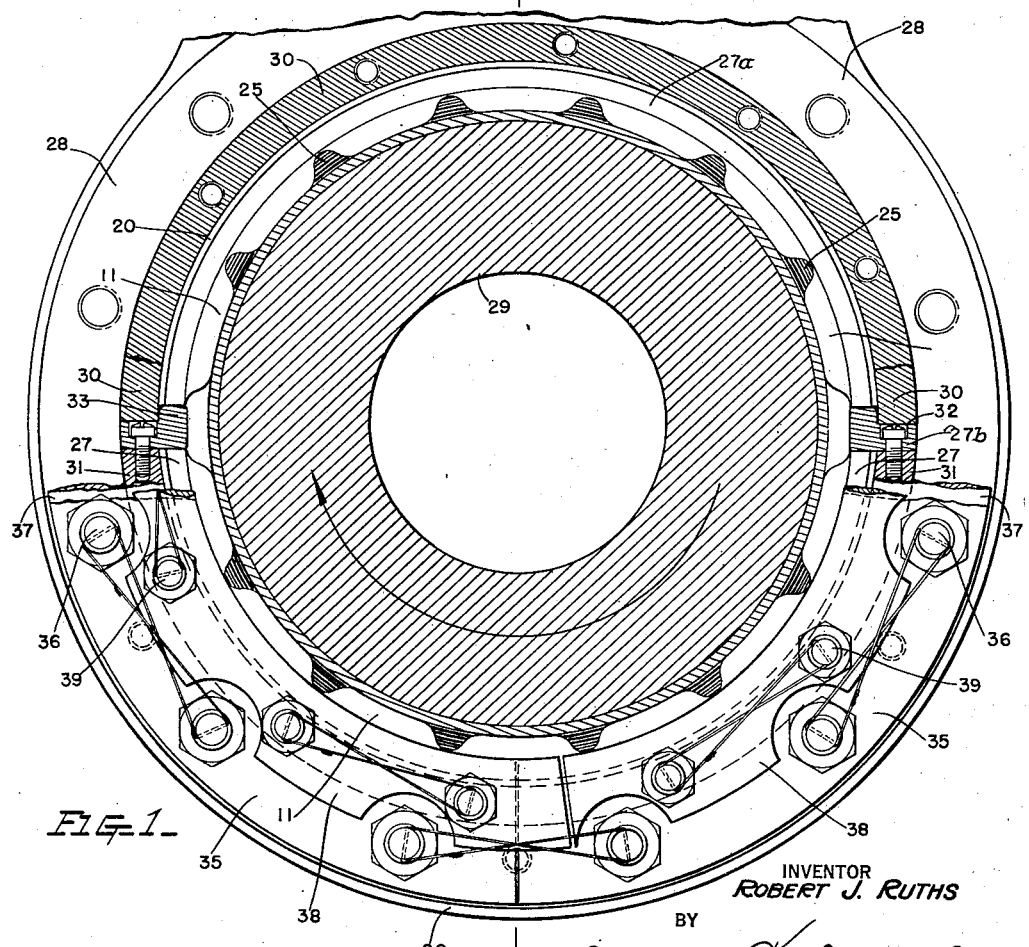

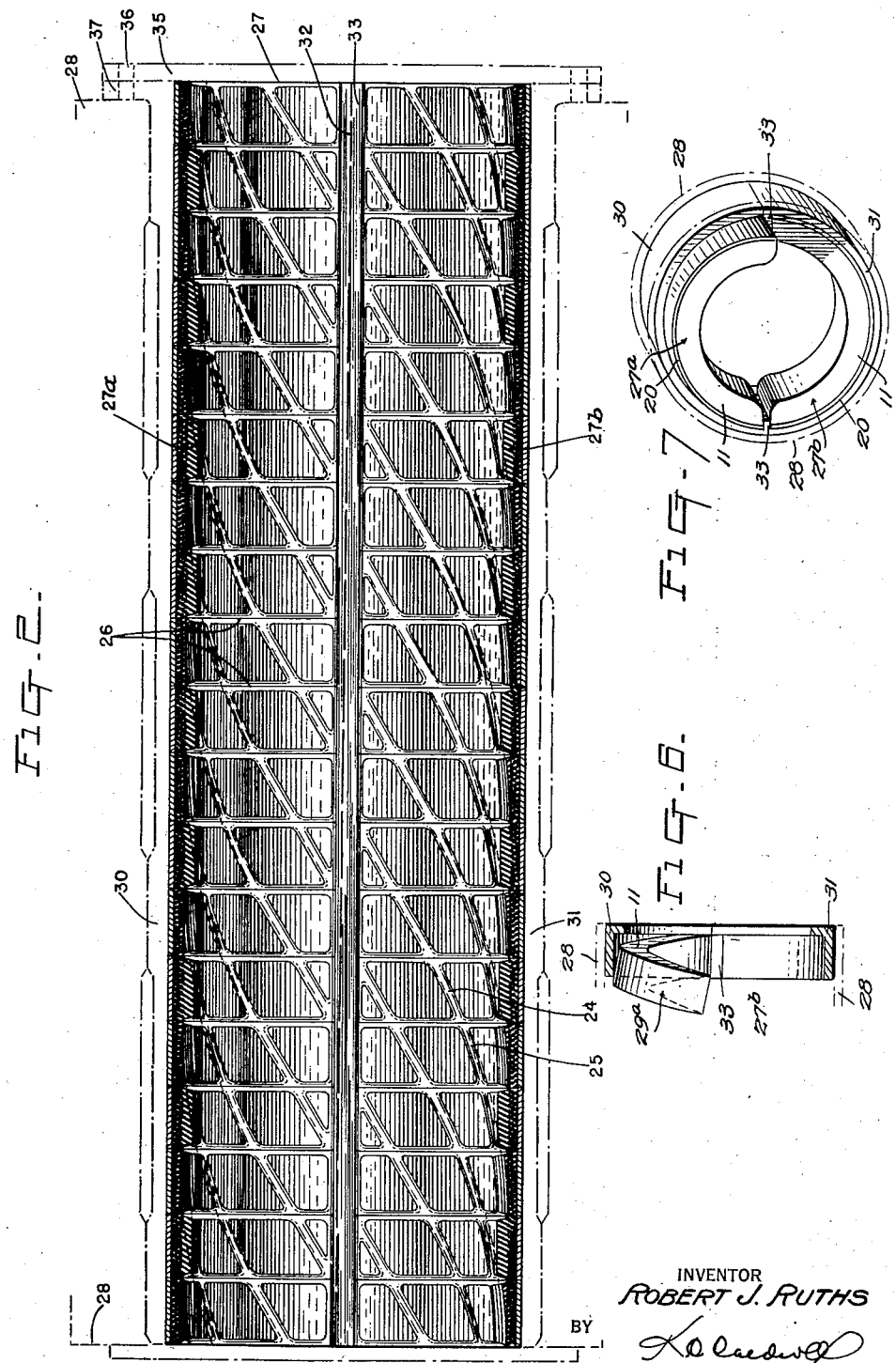

2,282,345

UNITED STATES PATENT OFFICE 2,282,345

BEARING STRUCTURE

Robert J. Ruths, Baltimore, Md.

Application May 16, 1941, Serial No. 393,747

8 Claims. (Cl. 308—238)

(Granted under the act of March 3, 1883, as amended April 30, 1928; 370 O. G. 757)

The present invention relates to bearing structures, and it has a particular relation to bearings subjected to the action of water such as the shafting of marine propellers, turbines and the like. It is an improvement on the bearing structure which is the subject of Letters Patent No. 2,237,316, granted to me April 8, 1941.

The principal object of this invention is the provision of a bearing structure fabricated in the manner described in the above mentioned patent, that is to say in the form of a reinforced laminated helical band having a resilient antifriction tread or shaft engaging portion, but which differs therefrom in that it is subsequently cut into a series of separate sections adapted to be sprung into annular shape when inserted in the bearing housing so as to expand radially into frictional contact therewith and be disposed in parallel planes extending at right angles to the longitudinal axis of the shaft, said sections having a plurality of helical channels formed therein for the passage of a lubricant.

Another object of the invention is the provision of a bearing structure of the type described in which the annular bearing sections are again cut into semicircular complementary members adapted to be inserted in the bearing housing above and below the shaft with a wedging action so that when installed in place in contiguous relation they will intimately contact with the surface of the shaft.

With these and other objects in view, as well as other advantages that may be incident to the use of the improvements, the invention consists in the parts and combinations thereof hereinafter set forth and claimed, with the understanding that several necessary elements constituting the same may be varied in proportion and arrangement without departing from the nature and scope of the invention, as defined in the appended claims.

In order to make the invention more clearly understood, there are shown in the accompanying drawings, means for carrying the invention into practical use, without limiting the improvements in their useful application to the particular construction, which, for the purpose of explanation, have been made the subject of illustration.

In the accompanying drawings:

Fig. 1 is a view partly in end elevation and partly in transverse section of a shaft bearing structure constructed in accordance with the invention, Fig. 2 is a vertical longitudinal sectional view of the improved bearing structure on a smaller scale taken on line 2—2 of Fig. 1, Fig. 3 is a fragmentary elevational view of the bearing and illustrating the contiguous disposition of the annular members and the arrangement of the lubricating passageways therein, Fig. 4 is a longitudinal sectional view taken substantially on line 4—4 of Fig. 3, Fig. 5 is a transverse sectional view taken on line 5—5 of Fig. 3, Fig. 6 is a diagrammatic view partly in longitudinal section and partly in side elevation illustrating the manner in which the bearing elements are assembled in the housing, and Fig. 7 is a diagrammatic perspective view of the structure shown in Fig. 6.

Referring to the drawings, a flexible helical band 10 of composite laminated structure is first fabricated as shown and described in my Patent No. 2,237,316 aforementioned, which band comprises in its essentials, an inner flexible antifriction tread portion 11 of rubber or the like, superimposed breaker strips 12, 13, and 14, having brass or bronze wire mesh, molded therein for reenforcing purposes, interposed strips 18 and 19 of a suitable vulcanizable compound such as rubber, duprene or the like and an outer band 20 of brass or bronze, the assembly being vulcanized together to form a unitary structure. The inner tread portion 11 of the band 10 is formed with a plurality of spaced diagonally extending grooves or indentations 24 (Fig. 3) which cooperate and register with one another in the assembled bearing, Fig. 2, to provide a plurality of spaced helical channels 25 of relatively steep pitch extending longitudinally of the bearing. Also, the opposite inner edges of the tread portion 11 is beveled to form annular channels 26. As pointed out in said patent, these channels cooperate to conduct lubricating fluid longitudinally of the bearing with a squeegee action.

The helical band above described is then severed in a plane at right angles to the sides of the band into a plurality of sections or elements 27, each of the sections corresponding to one complete convolution of the helix. The elements thus formed have the general configuration of a lock washer of well known type, in that their ends are sprung or offset axially relatively to one another. These elements are then each again cut at a point 180° displaced from the first mentioned cut to form two complementary semicircular segments 27a and 27b having transversely offset ends.

As illustrated in Fig. 1, the improved bearing is shown as being confined in a bearing housing 28 and supporting a shaft 29. This housing is of standard construction and includes upper and lower semicylindrical bearing shells 30 and 31 which are removably mounted therein. These semicylindrical shells constitute the main support for the actual bearing elements 27 and the lower shell is provided along its upper longitudinal edges or lines of split, indicated by the broken line 32 in Fig. 2, with abutment bars 33 in Fig. 1. The shell portions 30 and 31 are inserted in the bearing housing one at a time and the action of the abutment bar 33 is such as to force the shells radially outwardly into snug contact with the surface of the housing.

In assembly, the several semicircular segments 27b of the bearing proper are mounted in the lower shell member 31 in the positions shown in Fig. 2 in which the indentations 24 are aligned in such manner as to define a series of semihelical passageways or channels constituting one-half of the channels 25. The shell 31 with the bearing elements 27b disposed in position therein is then inserted into the bearing housing 28 and the shaft 29 lowered so as to rest on and be supported thereby. The upper half or semicylindrical portion 30 of the bearing shell is then inserted in the housing, but without having the bearing segments 27a yet positioned therein, the action of the wedging bar 33 forcing the portions of the shells into intimate contact with the bearing housing 28 in the manner previously described. The semicircular upper segment 27a of the bearing elements 27 are then successively inserted in the upper portion of the shell 30 and in contact with the shaft 29. These segments are arranged as shown in Fig. 2 so that their respective indentations 24 will also register with one another to define a series of semihelical passageways which communicate with corresponding semihelical passageways in the lower half of the bearing. These segments 27a of the bearing elements 27 are preferably positioned between the shell portions 30 and 31 and shaft 29 by tamping them in place successively with a tool corresponding in function to a chalking tool and they may be lubricated with a soap compound to facilitate their assembly.

The several segments of each of the bearing elements prior to assembly in the housing, together form a convolution of a helix the outside diameter of which is slightly less than the internal diameter of the housing. However, when they are forced into position within the housing they are flattened into the annular form shown in Figs. 2 and 2, the diameter of the annulus being size in size with the internal diameter of the housing, so that it will have a tight fit therewith. During the insertion of the upper segments 27a in the housing their axially offset ends contact the abutment bars 33 with a camming action which causes them to expand radially into tight wedging contact with the upper shell portion 30. Also, during the assembly the outer surfaces of the segments in contact with the housing act to lead the segments into operative position within the housing. This configuration of the bearing elements also lends itself to disassembly for replacement purposes.

The bearing elements thus mounted around the shaft 29 are maintained against displacement by a retaining ring 35 which is secured to the bearing housing 28 by stud bolts 36 which pass through a flange 37 formed on the end of the upper and lower halves of the shell. As is the general practice, a zinc flange 38 is secured on the outer face of the retaining ring 35 by bolts 39 to prevent electrolytic corrosion.

It will be noted from the above description and from an inspection of the drawings, that the several segments of the adjacent bearing elements assume a flat shape when finally positioned so that the plane of each of the elements extends at right angles to the longitudinal axis of the shaft. Where so positioned the indentations 24 in each element register with the corresponding indentations in the adjacent elements and define a plurality of helical channels or lubricating passageways extending the entire length of the bearing.

It will be understood that the above description and accompanying drawings comprehend only the general and preferred embodiment of the invention and that various changes in construction, proportion and arrangement of the parts may be made within the scope of the appended claims without sacrificing any of the advantages of the invention.

The invention described herein may be manufactured and used by and for the Government of the United States of America for governmental purposes without the payment of any royalties thereon or therefor.

What I claim is:

1. A shaft bearing comprising a cylindrical housing having an internal abutment bar extending longitudinally thereof and an annular bearing element disposed within said housing and having a metallic outer base portion and a shaft-engaging tread portion of resilient anti-friction material united therewith, said bearing element being formed of separate arcuate segments having ends disposed in wedging contact with said abutment bar.

2. A shaft bearing comprising a cylindrical housing having a plurality of internal abutment bars extending longitudinally thereof and an annular bearing element disposed within said housing and having a metallic outer base portion and a shaft-engaging tread portion of resilient anti-friction material united therewith and a reenforcing wire mesh embedded therein, said bearing element being formed of separate arcuate segments having their ends disposed in wedging contact with said abutment bars.

3. A shaft bearing comprising a cylindrical housing having a plurality of internal abutment bars extending longitudinally thereof and an annular bearing element disposed within said housing and having a metallic outer base portion and a shaft-engaging tread portion of resilient anti-friction material united therewith and provided with diagonally disposed lubricating channels and having a reenforcing wire mesh embedded therein and secured to said outer base portion, said bearing element being formed of separate arcuate segments having their ends disposed in wedging contact with said abutment bars.

4. A bearing element comprising a metallic outer base portion and a shaft engaging tread portion of resilient anti-friction material united therewith, said bearing element consisting of a segment of a helix.

5. A bearing element comprising a metallic outer base portion and a shaft engaging tread portion of resilient anti-friction material united therewith, and a metallic reenforcing mesh embedded in said tread portion, said bearing element consisting of a segment of a helix.

6. A bearing element comprising a metallic outer base portion, a shaft engaging tread portion of resilient anti-friction material united therewith and a metallic reenforcing mesh embedded in said tread portion and secured to said base portion, said bearing element consisting of a segment of a helix.

7. A bearing element comprising a metallic outer base portion, and a shaft engaging tread portion of resilient anti-friction material united therewith and having diagonally disposed lubricating grooves formed therein, said bearing element consisting of a segment of a helix.

8. A bearing element comprising a metallic outer bore portion, a shaft engaging tread portion of resilient anti-friction material united therewith and a metallic reenforcing mesh embedded therein and secured to said base portion, said tread portion having diagonally disposed lubricating grooves formed therein, said bearing element being of arcuate configuration with its ends axially offset relative to each other.

ROBERT J. RUTHS.